(12) United States Patent
Shi et al.

(10) Patent No.: US 11,521,489 B2
(45) Date of Patent: Dec. 6, 2022

(54) VEHICLE-BASED ROTATING CAMERA METHODS AND SYSTEMS

(71) Applicant: TUSIMPLE, INC., San Diego, CA (US)

(72) Inventors: Zhujia Shi, San Diego, CA (US);
Charles A. Price, San Diego, CA (US);
Zehua Huang, San Diego, CA (US);
Xiaodi Hou, San Diego, CA (US);
Xiaoling Han, San Diego, CA (US);
Todd Skinner, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 367 days.

(21) Appl. No.: 16/788,164

(22) Filed: Feb. 11, 2020

(65) Prior Publication Data

US 2020/0258382 A1   Aug. 13, 2020

Related U.S. Application Data

(60) Provisional application No. 62/803,992, filed on Feb. 11, 2019.

(51) Int. Cl.
*G08G 1/017* (2006.01)
*B60R 11/04* (2006.01)
(Continued)

(52) U.S. Cl.
CPC .......... *G08G 1/0175* (2013.01); *B60R 11/04* (2013.01); *B60R 21/0136* (2013.01); *G01S 17/89* (2013.01); *G03B 17/561* (2013.01); *G05D 1/0088* (2013.01); *G05D 2201/0213* (2013.01); *G06V 20/625* (2022.01)

(58) Field of Classification Search
CPC ..... B60R 2300/101; B60W 2050/0215; G05D 1/0055; H04N 7/18; G06K 9/00
See application file for complete search history.

(56) References Cited

U.S. PATENT DOCUMENTS 6,421,081 B1 *  7/2002  Markus .................. H04N 7/185
                                                          348/148
8,243,138 B2 *  8/2012  Yamamoto ............... B60R 1/00
                                                          348/148

(Continued)

OTHER PUBLICATIONS

Scheuer, Jurgen. European Application No. 20156576.9-1132, Extended European Search Report dated Jul. 20, 2020, pp. 1-9.

(Continued)

*Primary Examiner* — Tan Q Nguyen
(74) *Attorney, Agent, or Firm* — Paul Liu; Yi Liu; Perkins Coie, LLP

(57) ABSTRACT

Disclosed are devices, systems and methods for using a rotating camera for vehicular operation. One example of a method for improving driving includes determining, by a processor in the vehicle, that a trigger has activated, orienting, based on the determining, a single rotating camera towards a direction of interest, and activating a recording functionality of the single rotating camera, where the vehicle comprises the single rotating camera and one or more fixed cameras, and where the single rotating camera provides a redundant functionality for, and consumes less power than, the one or more fixed cameras.

20 Claims, 16 Drawing Sheets

(51) Int. Cl.
  B60R 21/0136 (2006.01)
  G01S 17/89 (2020.01)
  G03B 17/56 (2021.01)
  G05D 1/00 (2006.01)
  *G06V 20/62* (2022.01)

(56) References Cited

U.S. PATENT DOCUMENTS

| | | | | |
|---|---|---|---|---|
| 8,248,471 | B2 * | 8/2012 | Inui | G06T 7/80 |
| | | | | 701/1 |
| 9,201,421 | B1 | 12/2015 | Fairfield | |
| 2003/0080878 | A1 * | 5/2003 | Kirmuss | G11B 27/36 |
| | | | | 348/E7.086 |
| 2008/0161986 | A1 | 7/2008 | Breed et al. | |
| 2008/0316312 | A1 * | 12/2008 | Castillo | B60R 25/305 |
| | | | | 348/E7.086 |
| 2010/0219944 | A1 * | 9/2010 | McCormick | G07C 5/0866 |
| | | | | 348/148 |
| 2011/0234749 | A1 * | 9/2011 | Alon | G07C 5/0866 |
| | | | | 348/148 |
| 2016/0082953 | A1 * | 3/2016 | Teller | B60W 30/08 |
| | | | | 701/23 |
| 2018/0040171 | A1 | 2/2018 | Kundu et al. | |
| 2018/0201138 | A1 | 7/2018 | Yellambalase et al. | |
| 2018/0372875 | A1 | 12/2018 | Juelsgaard et al. | |
| 2019/0300007 | A1 | 10/2019 | Hilligardt et al. | |

OTHER PUBLICATIONS

Scheuer, Jurgen. European Application No. 20156576.9-1132, Examination Report dated Mar. 3, 2021, pp. 1-5.

\* cited by examiner

VEHICLE-BASED ROTATING CAMERA METHODS AND SYSTEMS

CROSS-REFERENCE TO RELATED APPLICATION

This patent document claims priority to and benefits of U.S. Provisional Patent Application No. 62/803,992 entitled "VEHICLE-BASED ROTATING CAMERA METHODS AND SYSTEMS" filed on Feb. 11, 2019. The entire contents of the aforementioned patent application are incorporated by reference as part of the disclosure of this patent document.

TECHNICAL FIELD

This document relates to using cameras to improve vehicular driving.

BACKGROUND

Autonomous vehicle navigation is a technology for sensing the position and movement of a vehicle and, based on the sensing, autonomously control the vehicle to navigate towards a destination. Autonomous vehicle navigation can have important applications in transportation of people, goods and services. In addition to enabling navigation, the cameras and sensors of autonomous vehicles ensure the safety of the vehicle and its passengers, as well as people and property in the vicinity of the vehicle.

SUMMARY

Disclosed are devices, systems and methods for using a rotating camera to increase vehicular safety and improve maneuvering and vehicular operation. In an example, this is achieved by using the rotating camera for environmental monitoring, security monitoring, flexible vision, and redundant sensing.

In one aspect, the disclosed technology can be used to provide a method for improving driving of a vehicle. This method includes determining, by a processor in the vehicle, that a trigger has activated, orienting, based on the determining, a single rotating camera towards a direction of interest, and activating a recording functionality of the single rotating camera, where the vehicle comprises the single rotating camera and one or more fixed cameras, and where the single rotating camera provides a redundant functionality for, and consumes less power than, the one or more fixed cameras.

In another aspect, the disclosed technology can be used to provide a method for improving driving of a vehicle. This method includes determining, by a processor in the vehicle, that a trigger has activated, orienting, based on the determining, a single rotating camera towards a direction of interest, and activating a recording functionality of the single rotating camera, where the vehicle comprises the single rotating camera and one or more fixed cameras, where the single rotating camera provides a redundant functionality for, and consumes less power than, the one or more fixed cameras, and where the vehicle is an autonomous vehicle operating in a level 4 (L4) or a level 5 (L5) automation mode.

In yet another aspect, the disclosed technology can be used to provide a method for improving driving of a vehicle. This method includes determining, by a processor in the vehicle, that a trigger has activated, orienting, based on the determining, a single rotating camera towards a direction of interest, activating a recording functionality of the single rotating camera, and transmitting information related to the trigger and the direction of interest to a remote monitoring station, wherein the vehicle comprises the single rotating camera and one or more fixed cameras, wherein the single rotating camera provides a redundant functionality for the one or more fixed cameras, and wherein the single rotating camera consumes less power than the one or more fixed cameras.

In yet another aspect, the above-described method is embodied in the form of processor-executable code and stored in a computer-readable program medium.

In yet another aspect, a device that is configured or operable to perform the above-described method is disclosed. The device may include a processor that is programmed to implement this method.

The above and other aspects and features of the disclosed technology are described in greater detail in the drawings, the description and the claims.

DETAILED DESCRIPTION

Figure 1A:
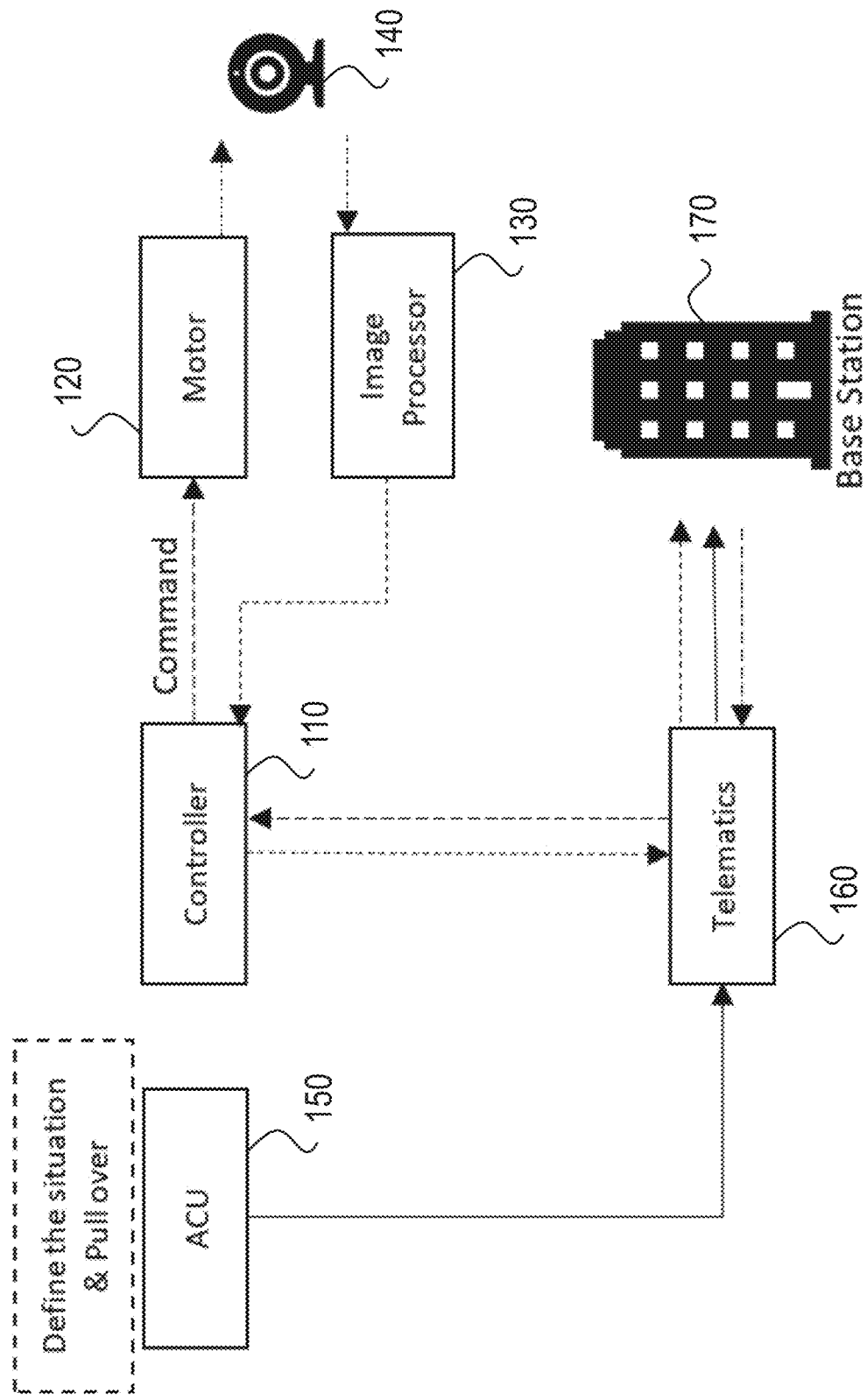
FIG. 1A shows an example of assessing a situation based on using a rotating camera in a vehicle, in accordance with embodiments of the disclosed technology.

The transportation industry has been undergoing considerable changes in the way technology is used to control the operation of the vehicles. As exemplified in the automotive passenger vehicle, there has been a general advancement towards shifting more of the operational and navigational decision making away from the human driving and into on-board computing power. This is exemplified in the extreme by the numerous under-development autonomous vehicles. Autonomous vehicles may have various features, such as the partially-autonomous operation in some vehicles (e.g., autonomous acceleration and navigation, but with the requirement of a present and attentive driver), the safety-protecting operation of some vehicles (e.g., maintaining a safe following distance and automatic braking), the safety-protecting warnings of some vehicles (e.g., blind-spot indicators in side-view mirrors and proximity sensors), as well as ease-of-use operations (e.g., autonomous parallel parking).

These different types of autonomous vehicles have been classified into different levels of automation by under the SAE International's J3016 standard, ranging from Level 0 in which the vehicle has no automation to Level 4 (L4), which is characterized by the vehicle operating without human input or oversight but only under select conditions defined by factors such as road type or geographic area, and Level 5 (L5), which is characterized as a driverless car that can operate on any road and in any environment a human driver could negotiate.

For L4/L5 autonomous vehicles, especially for larger vehicles (e.g., container trucks) with minimal or no driver interaction or supervision requirement, vehicular and passenger safety are paramount. In these scenarios, the safe operation of an autonomous or semi-autonomous vehicle may be enhanced by a rotating camera in addition to a fixed camera system. The rotating camera can provide the vehicle user (or a remote monitoring station, or remote control center) with a continual 360° view of the environment surrounding the vehicle in a power-efficient manner (e.g., since a single rotating camera typically consumes less power than a fixed camera system with multiple cameras). In some embodiments, the rotating camera may be located on the tractor of a tractor-trailer. In other embodiments, the rotating camera can also provide flexible or redundant vision for the autonomous driving solution. In yet other embodiments, it may also advantageously improve safety in L2 and L3 autonomous vehicles.

Section headings are used in the present document to improve readability of the description and do not in any way limit the discussion or the embodiments (and/or implementations) to the respective sections only.

Examples of Environmental Monitoring

As noted earlier, an L4 autonomous vehicle is configured to operate without human input or oversight but only under select conditions defined by factors such as road type, weather conditions or geographic area. Thus, if specific scenarios are encountered while the vehicle is under autonomous operation, the system is designed to stop operation through a safe process. For example, if the system is not designed to operate in snowy weather, then when the system detects that it is snowing, the system would cause the vehicle to park itself. When it is detected that the snow has stopped, the system may resume the trip.

In some embodiments, the rotating camera may be configured to perform monitoring and determining whether the conditions are safe to continue the trip. In an example, and before resuming, the rotating camera may be used to perform an environmental check to ensure there is no damage or potential danger in the vicinity of the vehicle/truck. For example, the owner or remote monitoring station can control the rotating camera's direction and focus to check any specific objects in the vicinity of the vehicle. In scenarios with minimal access to infrastructure in adverse weather conditions (e.g., long-haul container trucks routes stranded between towns due to inclement weather), the environment may be monitored at any time since the rotated camera is designed to consume less power than the fixed camera system and other algorithm sensors in the vehicle. In an example, the vehicle power supply can support the rotating camera for at least 24 hours when both the engine and autonomous system is powered off.

An example of a monitoring scenario is shown in FIG. 1A, wherein the rotating camera 140 is mechanically controlled by a motor 120, which in turn is controlled by a controller 110. The controller 110 is also configured to receive pictures and/or video taken by the rotating camera 140, via the image processor 130. As described earlier, the remote monitoring station 170 may control the rotating camera 140 through the controller 110 via the telematics module 160 (e.g., which enables the rotating camera to scan the environment before the vehicle resumes its trip). The telematics module 160 also receives commands from the automation control unit (ACU) 150 (e.g., which enables the rotating camera to continually monitor the environment to initially detect that the L4 autonomous vehicle has encountered a situation that requires it to cease operation).

Figure 1B:
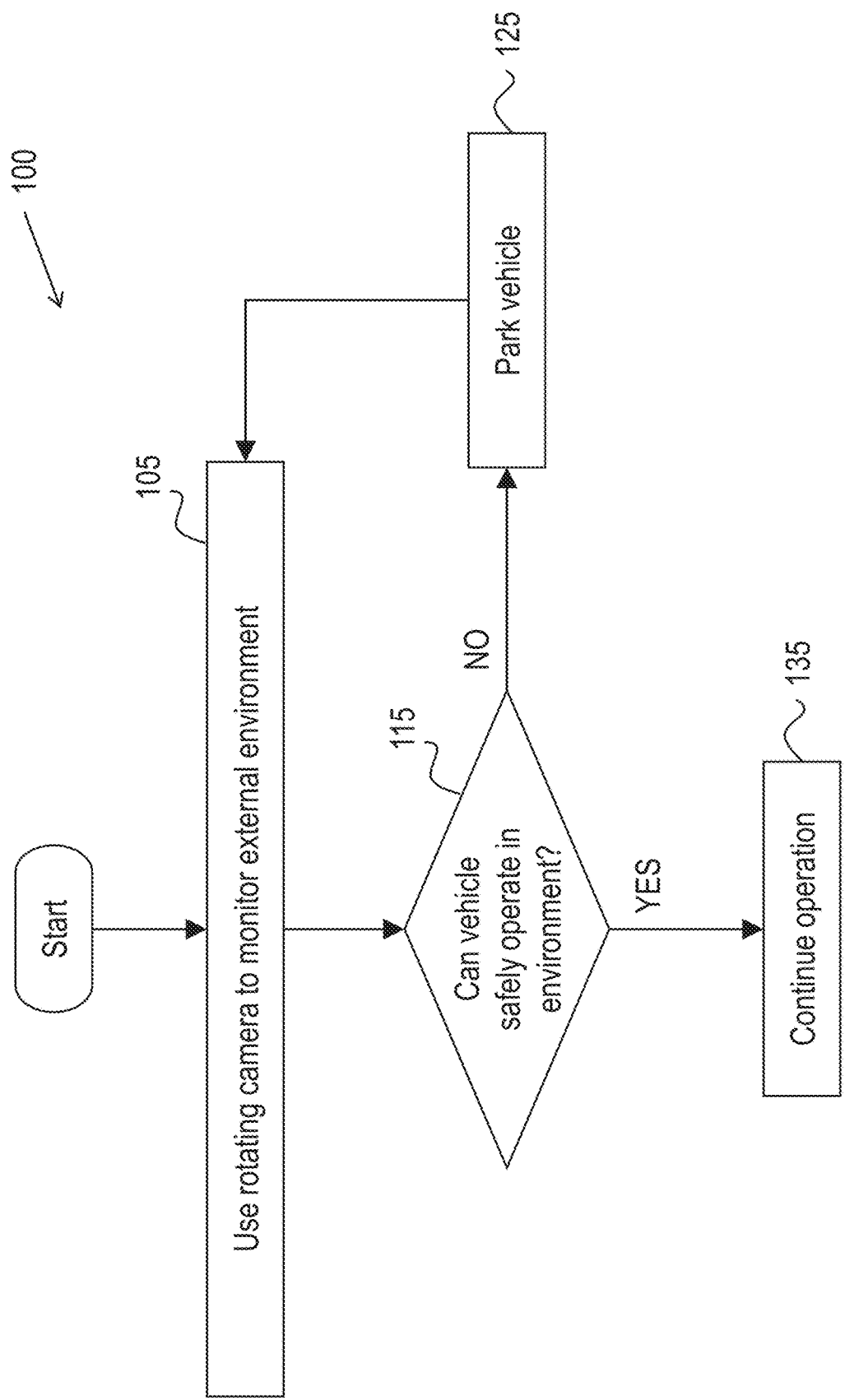
FIG. 1B shows a flowchart of an example method for assessing a situation based on using a rotating camera, in accordance with embodiments of the disclosed technology.

FIG. 1B shows a flowchart of an example method for assessing a situation based on using a rotating camera. As shown therein, the method starts with operation 105 wherein the rotating camera is used to monitor the external environment. A 360° view around the vehicle may be captured using the rotating camera to ascertain whether the vehicle can safely operate in the environment (operation 115). For example, and as described above, if the rotating camera records heavy snowfall and the vehicle is not equipped with chains, then it can be determined that the vehicle cannot be operation safely ("NO" branch from operation 115), and the vehicle is parked as soon as is possibly in a safe manner (operation 125). On the other hand, if the external environment is not too harsh (e.g., light rain and the vehicle is equipped with operating windshield wipers), then the vehicle can continue operating (operation 135). In the parked mode (operation 115), the vehicle can be configured to periodically use the rotating camera to continue to monitor the external environment (return to operation 105), and if it continues to determine that it cannot safely operate (operation 115), it remains parked (operation 125).

Examples of Security Monitoring

Figure 2A:
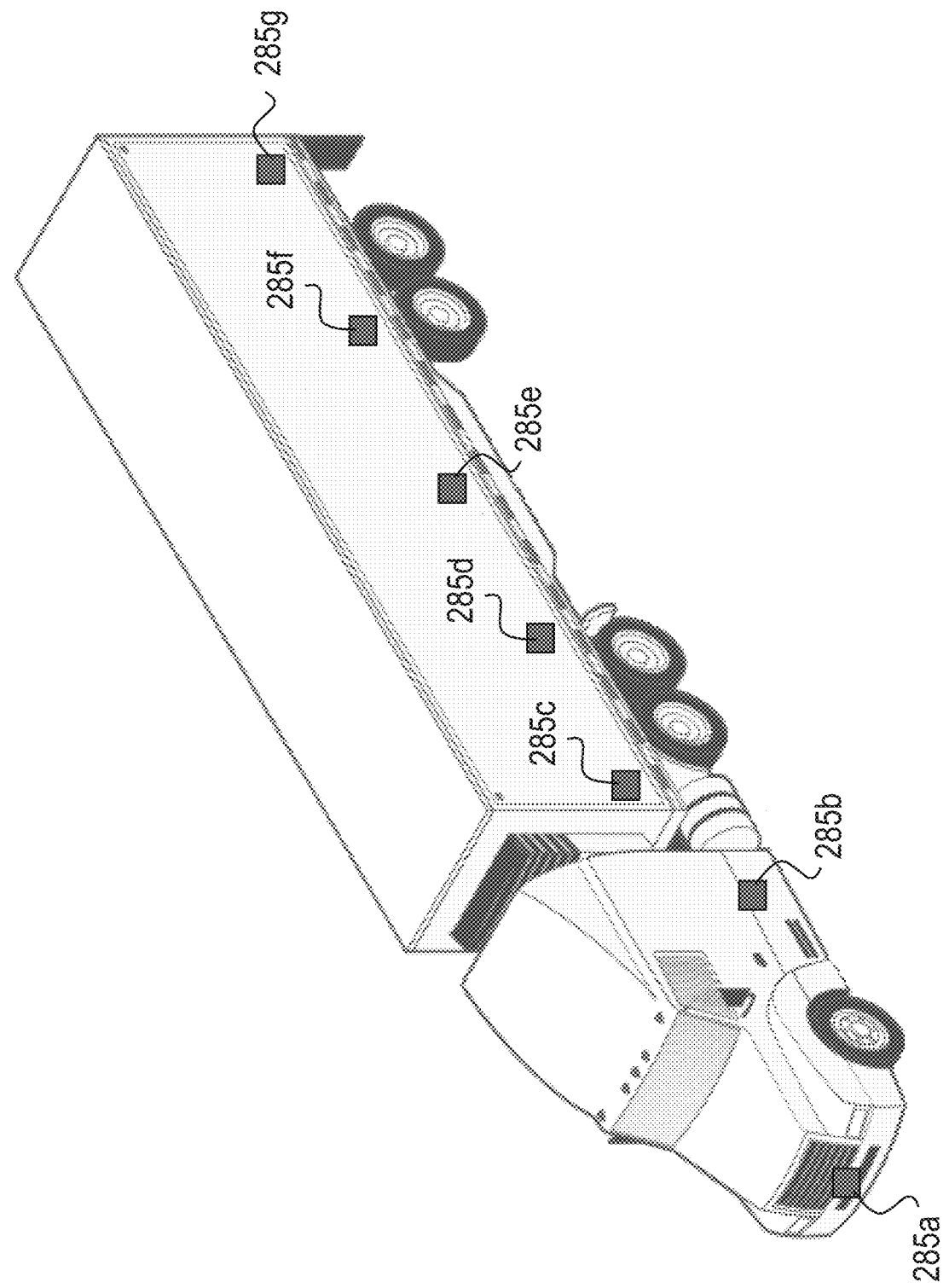
FIG. 2A shows examples of positioning one or more sensors on a tractor-trailer, in accordance with embodiments of the disclosed technology.
Figure 2B:
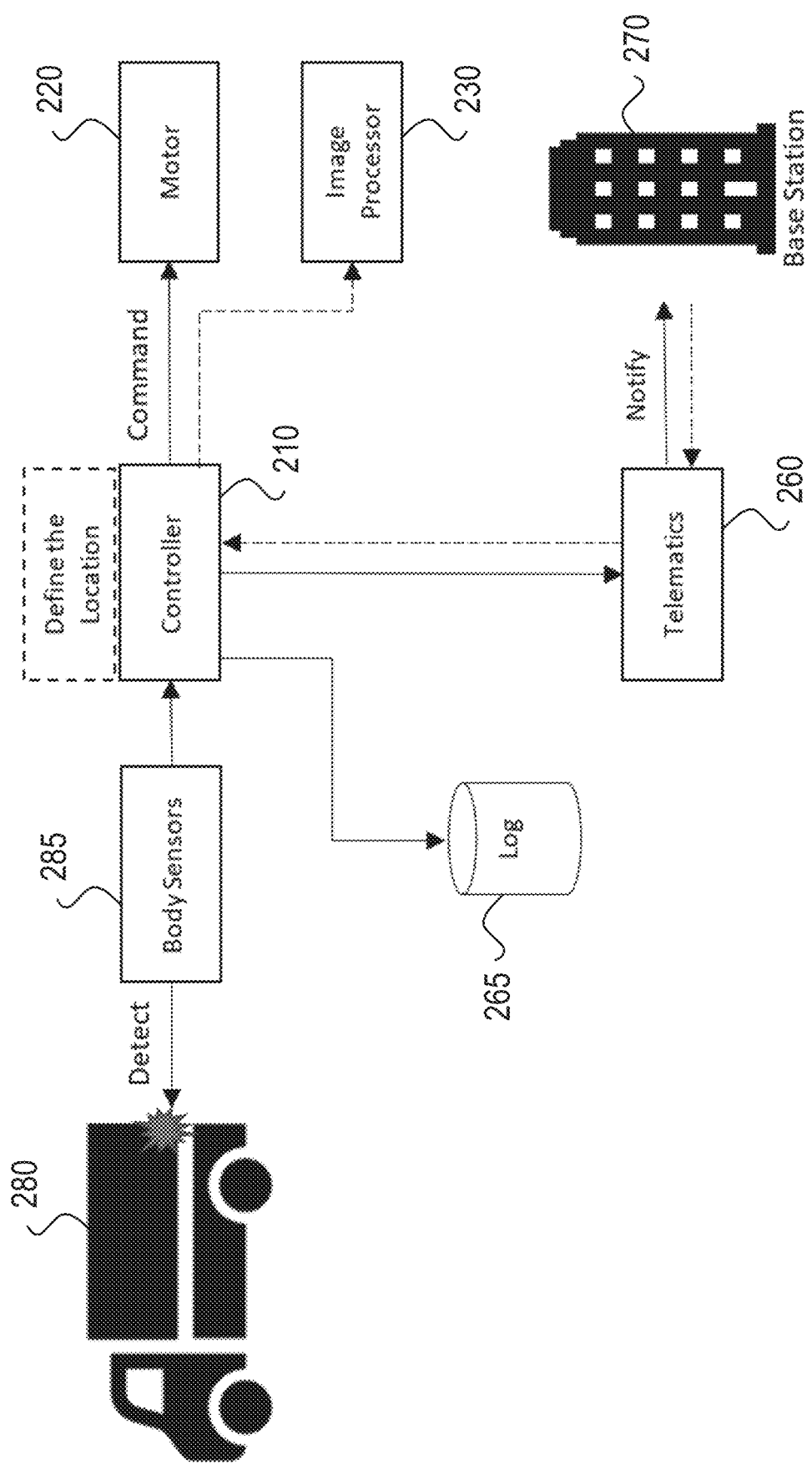
FIG. 2B shows an example of responding to a sensor activation using a rotating camera in a vehicle, in accordance with embodiments of the disclosed technology.

In some embodiments, and as shown in the example in FIG. 2B, when any part of the vehicle is impacted or intruded upon, the rotating camera can be automatically triggered to turn on, turn to the direction of the impact or intrusion and record the situation. This example includes some features and/or components that are similar to those shown in FIG. 1A, and described above. At least some of these features and/or operations may not be separately described in this section.

FIG. 2A shows examples of positioning one or more sensors on an autonomous tractor-trailer configuration. As shown therein, the sensors are mounted to both the tractor (285a and 285b) and trailer (285c through 285g), and enable detection of forces applied to the body of the vehicle. In an example, the sensors (285a-285g) can be impact monitoring sensors (e.g., ShockWatch indicators) that are connected to the controller of the vehicle, which can thereby determine if any impact has occurred since these sensors trigger when they are impacted by a force that exceeds a certain threshold (e.g., 5 G to 100 G). In another example, the sensors (285a-285g) may include inertial measurement units (IMUs) or wireless IMUs (WIMUs), which typically include an accelerometer and gyroscope.

FIG. 2B shows an example of responding to a sensor activation using a rotating camera in a vehicle. As shown therein, signals sensed by the sensors 285 are sent to the controller 210. One or more algorithms in the controller 210 would ascertain the location of the force (based on the signals from the sensors 285), and send commands to the rotating camera (not shown in FIG. 2) via the motor 220. Concurrently, the controller sends signals to the telematics module 260, which notifies the remote monitoring station 270 of the impact or intrusion.

In some embodiments, the video and/or images from the rotating camera are received and processed by the image processor 230, and may optionally be stored in a log 265. In some embodiments, the remote monitoring station 270 may immediately review the video and/or images (which is receives via the telematics module 260) to determine whether the authorities (e.g., police or sheriff department) should be contacted. In other embodiments, the remote monitoring station 270 may further control the rotating camera to capture identification information (e.g., license plate, make, model, color) of the other vehicle involved in the impact or intrusion, and decide whether or not to contact the relevant insurance company to file a report and start processing a claim.

Figure 2C:
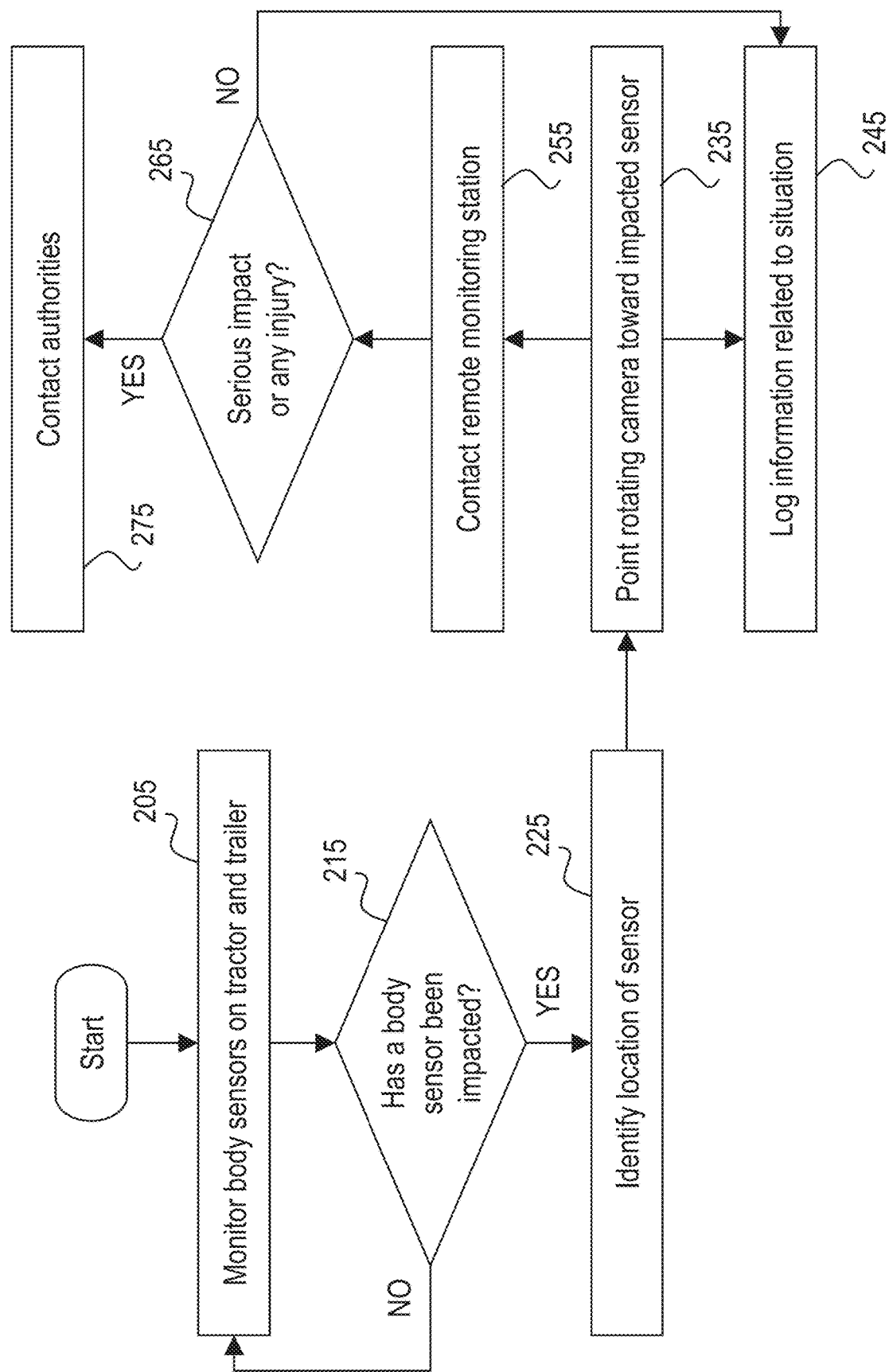
FIG. 2C shows a flowchart of an example method of responding to sensor activation using a rotating camera, in accordance with embodiments of the disclosed technology.

FIG. 2C shows a flowchart of an example method of responding to sensor activation using a rotating camera, corresponding to the scenario described in FIG. 2B. As shown therein, the method begins with the body sensors on both the tractor and trailer being continually monitored (operation 205). Upon detecting that a body sensor (e.g., sensors 285a-285g in FIG. 2A) has been impacted ("YES" branch from operation 215), the location of the sensor can be identified. In an example, each of the sensors affixed to the tractor and trailer may be wired to the controller (e.g., controller 210 in FIG. 2B). In another example, each of the sensors may be paired with a wireless transmitter that activates upon impact and transmits a sensor identification to the controller.

Once the location of the impacted sensor has been identified, the rotating camera is pointed toward that sensor (operation 235) and the recording functionality is activated. At this time, information related to the situation is logged (operation 245) and the remote monitoring station is contacted to provide details regarding the impact. In an example, the feed from the rotating camera may be observed in the remote monitoring station to determine whether this was a serious impact or if anyone was hurt (operation 265). If the situation warrants it, the authorities (e.g., police, sheriff's department, insurance company) are contacted (operation 275); otherwise the remote monitoring station explicitly logs that the situation was reviewed and that no further action was needed.

Examples of Flexible Vision

Figure 3A:
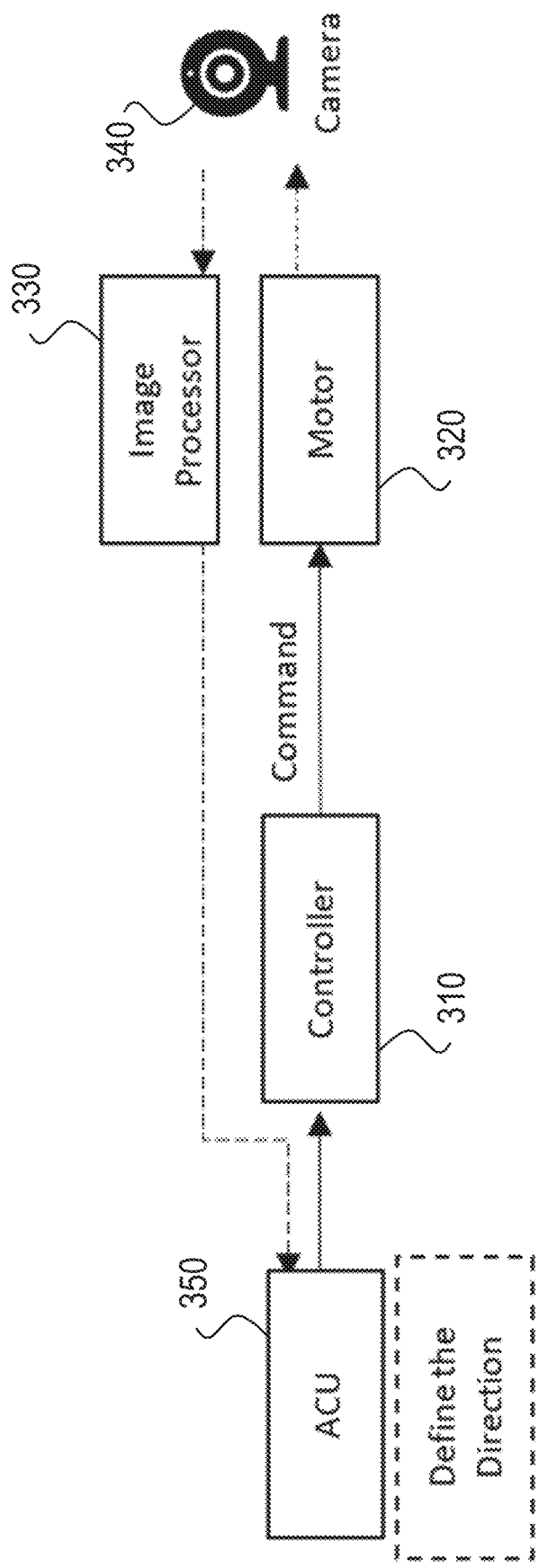
FIG. 3A shows an example of enabling a flexible field of view using a rotating camera in a vehicle, in accordance with embodiments of the disclosed technology.

In some embodiments, and as shown in FIG. 3A, when an increased field-of-view is required (e.g., turning in an intersection with an irregular shape or angle, as shown in the examples in FIGS. 4A-4D), the rotating camera 340 may be controlled to provide additional visual information to safely maneuver the intersection (due to areas 401 in FIGS. 4A-4D). This example includes some features and/or components that are similar to those shown in FIGS. 1A and 2B, and described above. At least some of these features and/or operations may not be separately described in this section.

In some embodiments, one or more algorithms in the ACU 350 combine information from a map module and a perception module (not shown in FIG. 3A) to determine the direction that the rotating camera 340 should turn toward. This direction is relayed to the controller 310, which controls the motor 320 connected to the rotating camera 340. The video and/or images captured by the rotating camera 340 are sent to the image processor 330, and then processed by the ACU 350 to determine whether the intersection is being properly covered.

Figure 3B:
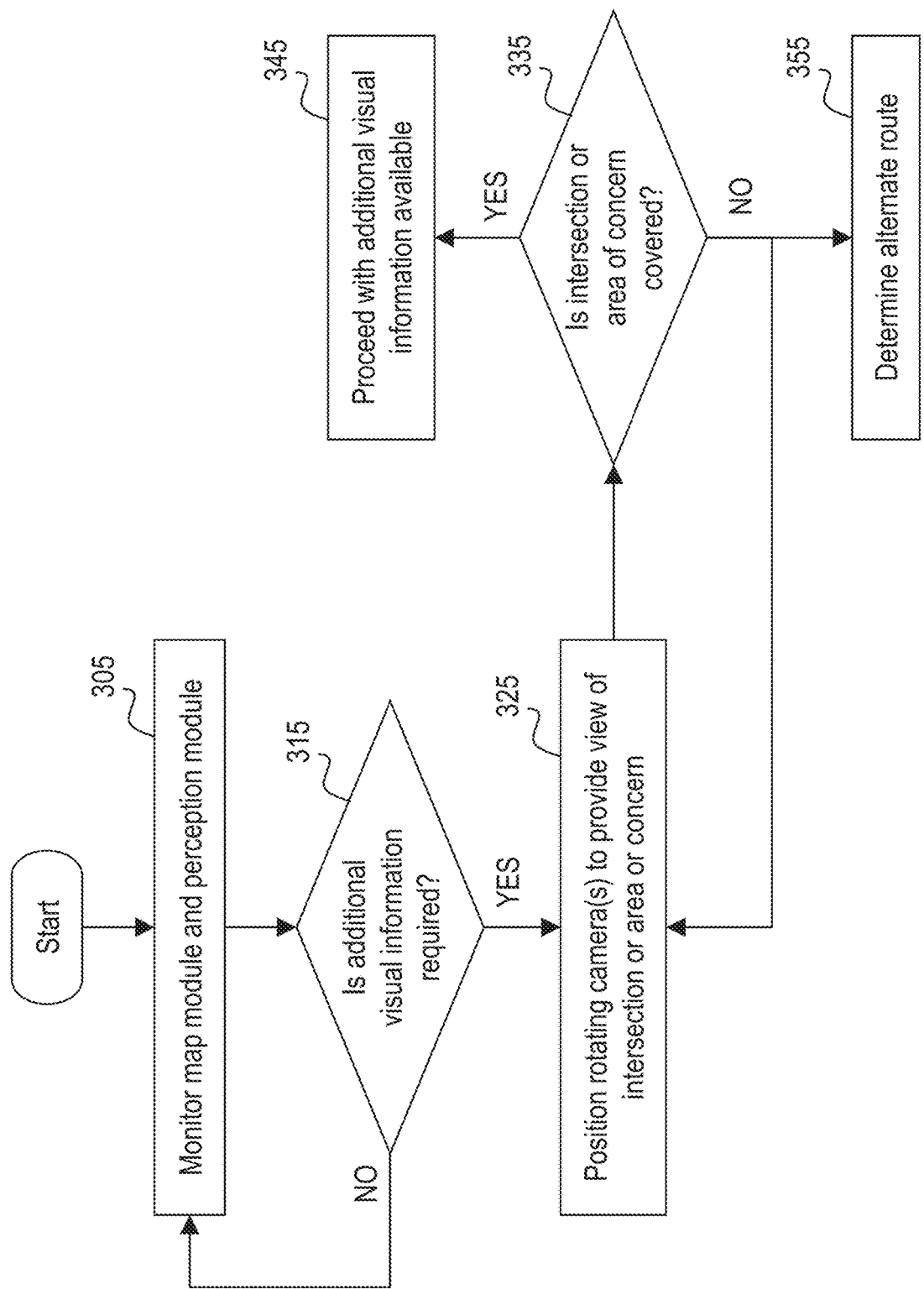
FIG. 3B shows a flowchart of an example method of enabling a flexible field of view using a rotating camera, in accordance with embodiments of the disclosed technology.
Figure 4A:
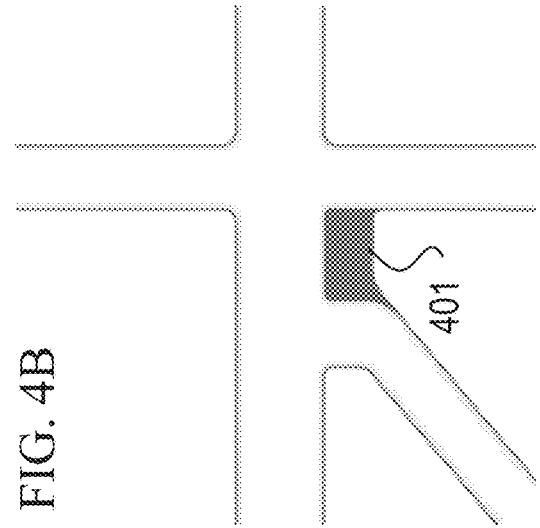
FIGS. 4A-4D show examples of intersections with irregular shapes or angles.
Figure 4B:
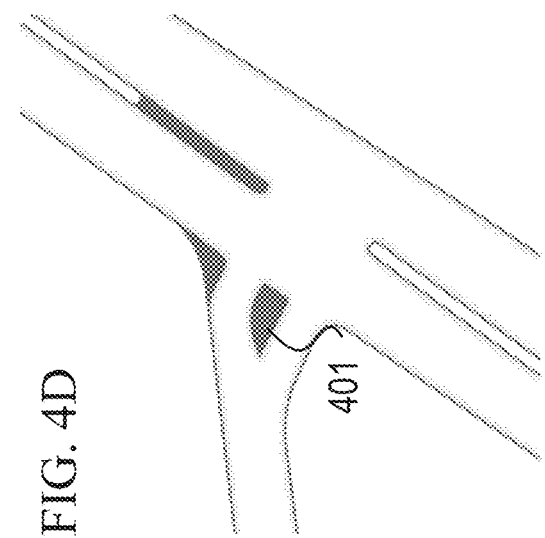
Figure 4C:
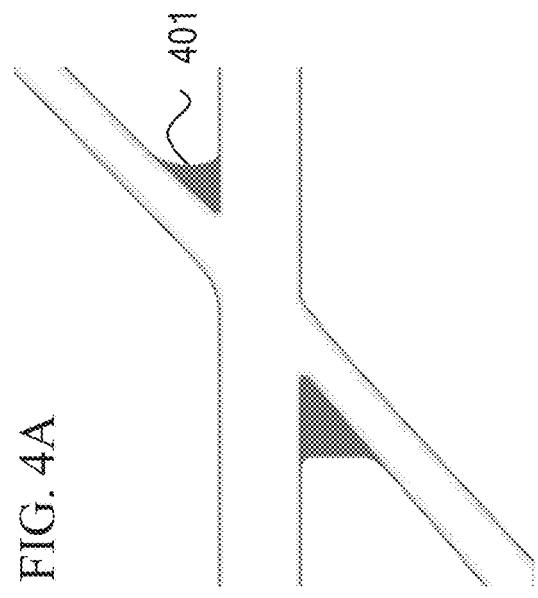
Figure 4D:
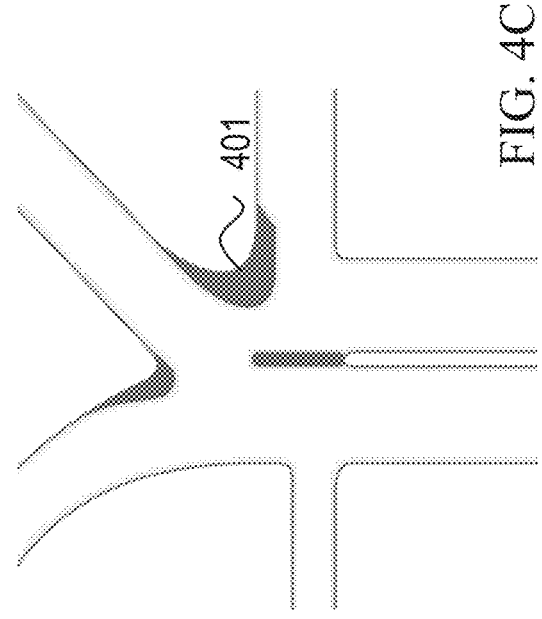

FIG. 3B shows a flowchart of an example method of enabling a flexible field of view using a rotating camera, corresponding to the scenario described in FIG. 3A. As shown therein, the method begins with the map and perception modules being monitored (operation 305), which ensures that the autonomous vehicle is proceeding on the predetermined route and that any upcoming area that might need additional visual information can be identified before the vehicle arrives at that location. Upon nearing the area, the controller (e.g., controller 310 in FIG. 3A) uses information from the map module (e.g., road and intersection information) and perception module (e.g., real-time traffic and construction, adjacent vehicles and pedestrians) to determine whether any additional visual information is needed (operation 315). In an example, there may be no external obstructions, and the vehicle proceeds cautiously without needing any additional visual information ("NO" branch from operation 315), and the map and perception modules continue to be monitored. In another example, the information from the perception module may necessitate the use of additional visual information ("YES" branch from operation 315), and the rotating camera is configured to provide a view of the intersection or area of concern (operation 325). For example, the direction that the rotating camera is turned to is based on obstructions identified by the perception module (e.g., construction, multiple pedestrians, etc.).

Upon receiving the additional visual information from the rotating camera, the controller can now determine whether the intersection or area of concern is adequately covered to proceed safely (operation 335). In an example, the controller can integrate the feed from the rotating camera with the output of other sensors (e.g., LiDAR), which will provide a more comprehensive view of the situation.

If the vehicle can proceed safely ("YES branch from operation 335), then the vehicle proceeds based on the visual information provided by the rotating camera. On the other hand ("NO" branch from operation 335), if the situation cannot be properly assessed (e.g., there may be another truck blocking the view of the rotating camera in one direction), then another rotating camera, if available, can be configured to assist (operation 325). If there is no other information available, and an obfuscated view of the situation persists, the vehicle may determine that using an alternate route is preferable (operation 355).

Examples of Redundant Sensing

Figure 5A:
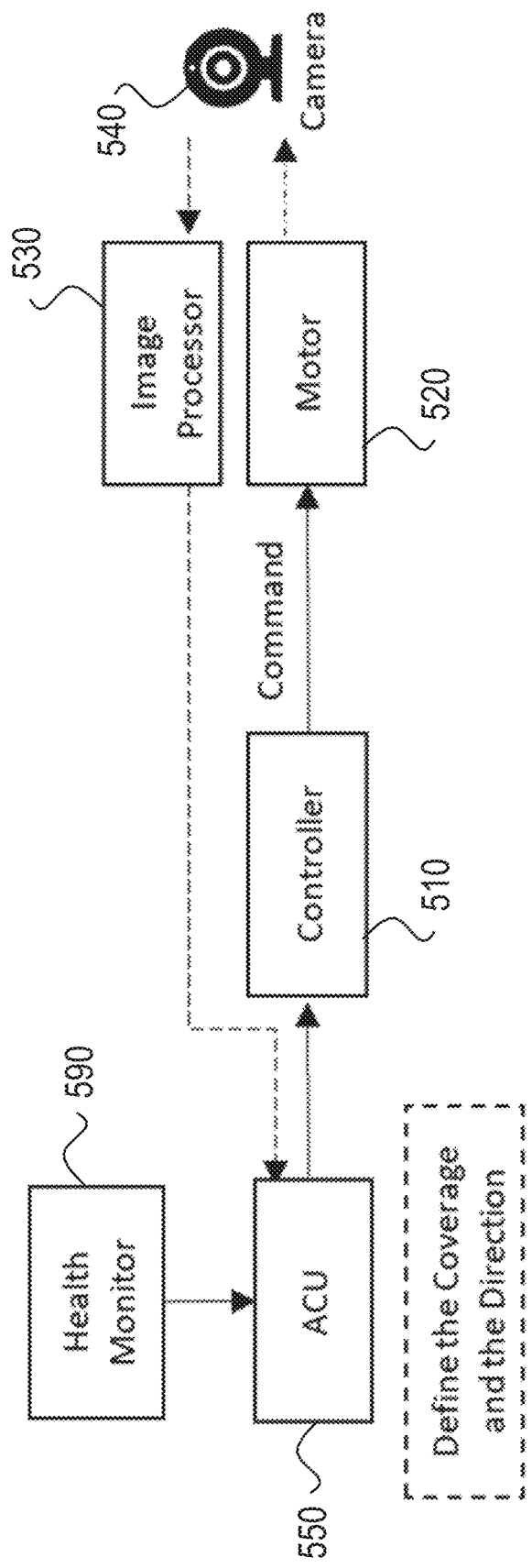
FIG. 5A shows an example of providing redundant camera functionality using a rotating camera in a vehicle, in accordance with embodiments of the disclosed technology.

In some embodiments, and as shown in FIG. 5A, when one or more sensors of the autonomous vehicle are unavailable, the rotating camera 540 may be used as a substitute camera for those inoperable sensors. This example includes some features and/or components that are similar to those shown in FIGS. 1A, 2B and 3A, and described above. At least some of these features and/or operations may not be separately described in this section.

In some embodiments, the health monitor 590 of the autonomous driving system may determine that one or more sensors have failed. In this scenario, the health monitor 590 will request that the ACU 550 identify what sensor coverage has been lost, and generate commands for the controller 510 to enable the rotating camera 540 to provide that coverage. In an example, each of the sensors can be configured to periodically transmit an operational status to the ACU, and a malfunctioning sensor can be identified based on its error code. In another example, a degradation in the fidelity of the information provided by a sensor can be interpreted as a malfunction.

In an example, the rotating camera 540 may provide redundancy for one of the cameras of the fixed camera system. Herein, the video and/or images from the rotating camera 540 may be combined with feeds from the fixed camera system to provide the coverage required by the autonomous vehicle. For example, the feeds from the fixed camera system and the rotating camera may have partially overlapping fields of view, and images from each of the component cameras may be stitched together to provide a more comprehensive view of the external environment that is required by the autonomous vehicle to operation.

In another example, the rotating camera 540 may provide redundancy for a rear-view or far-view camera, in which case the captured video and/or images may be pre-processed (e.g., the field-of-view, color and depth information may be adjusted) prior to providing the coverage required by the autonomous vehicle, as described above.

In some embodiments, the rotating camera 540 may provide redundancy for the light detection and ranging (LiDAR) system. The LiDAR system typically has a very wide field-of-view (e.g., 270°), and captures and processes images using three-dimensional point-cloud data. If the LiDAR system is rendered inoperable at any point, the most recent 3D point-cloud data may be updated and augmented based on captured images from the rotating camera 540, which can be rotated to provide the same very wide field-of-view at the LiDAR system. The integration of the image data into the 3D point-cloud data typically follows pre-processing the images to undistort the images and place them in the same frame of reference as the LiDAR system, which may be based on intrinsic parameters of the rotating camera (e.g., focal length, scan rate). In an example, the undistorting process may be calibrated prior to driving since the intrinsic parameters and locations of the LiDAR system and rotating camera on the vehicle are known.

Figure 5B:
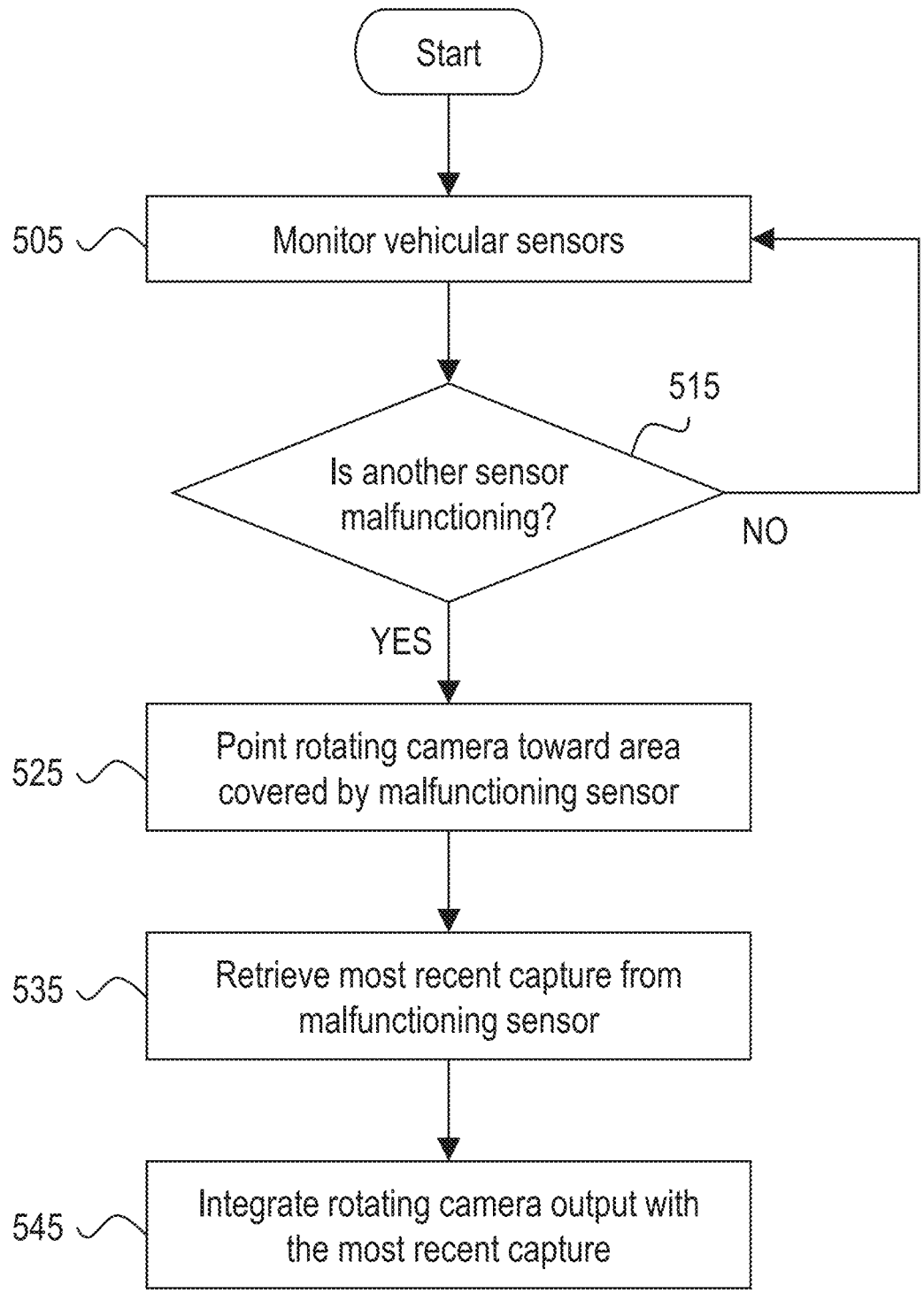
FIG. 5B shows a flowchart of an example method of providing redundant camera functionality using a rotating camera, in accordance with embodiments of the disclosed technology.

FIG. 5B shows a flowchart of an example method of providing redundant camera functionality using a rotating camera, corresponding to the scenario described in FIG. 5A. As shown therein, the method begins with the vehicular sensors being monitored (operation 505). If it is determined that all sensors are operational ("NO" branch from operation 515), then the sensors continue to be monitored. However, if there is a sensor that is malfunctioning ("YES" branch from operation 515), then that sensor is identified. In an example, each of the sensors can be configured to periodically transmit an operational status to the ACU (e.g., ACU 550 in FIG. 5A), and a malfunctioning sensor can be identified based on its error code. In another example, a degradation in the fidelity of the information provided by a sensor can be interpreted as a malfunction.

Once the malfunctioning sensor has been identified, the rotating camera can be pointed toward the area that was being covered by the malfunctioning sensor (operation 525). This is followed by the controller retrieving the most recent capture from the malfunctioning sensor (operation 535). In the case of a malfunctioning LiDAR system, the most recent capture may be 3D point-cloud data that meets a certain fidelity threshold (to avoid using corrupt or unreliable data from the LiDAR system). In the case of a malfunctioning fixed camera system, the most recent capture may be a series of images, each of which meet a certain different fidelity threshold.

The most recent capture can then be integrated with the images from the rotating camera (operation 545) in order to provide the redundant sensing capability. In some embodiments, subsequent images from the rotating camera can be used to update the integrated image by merging them with the original most recent capture or with the most recent integrated image.

Exemplary System Architecture for the Rotating Camera

FIG. 6 shows an example of the system architecture of a rotating camera. This example includes some features and/or components that are similar to those shown in FIGS. 1A, 2B, 3A and 5, and described above. At least some of these features and/or operations may not be separately described in this section.

Figure 6A:
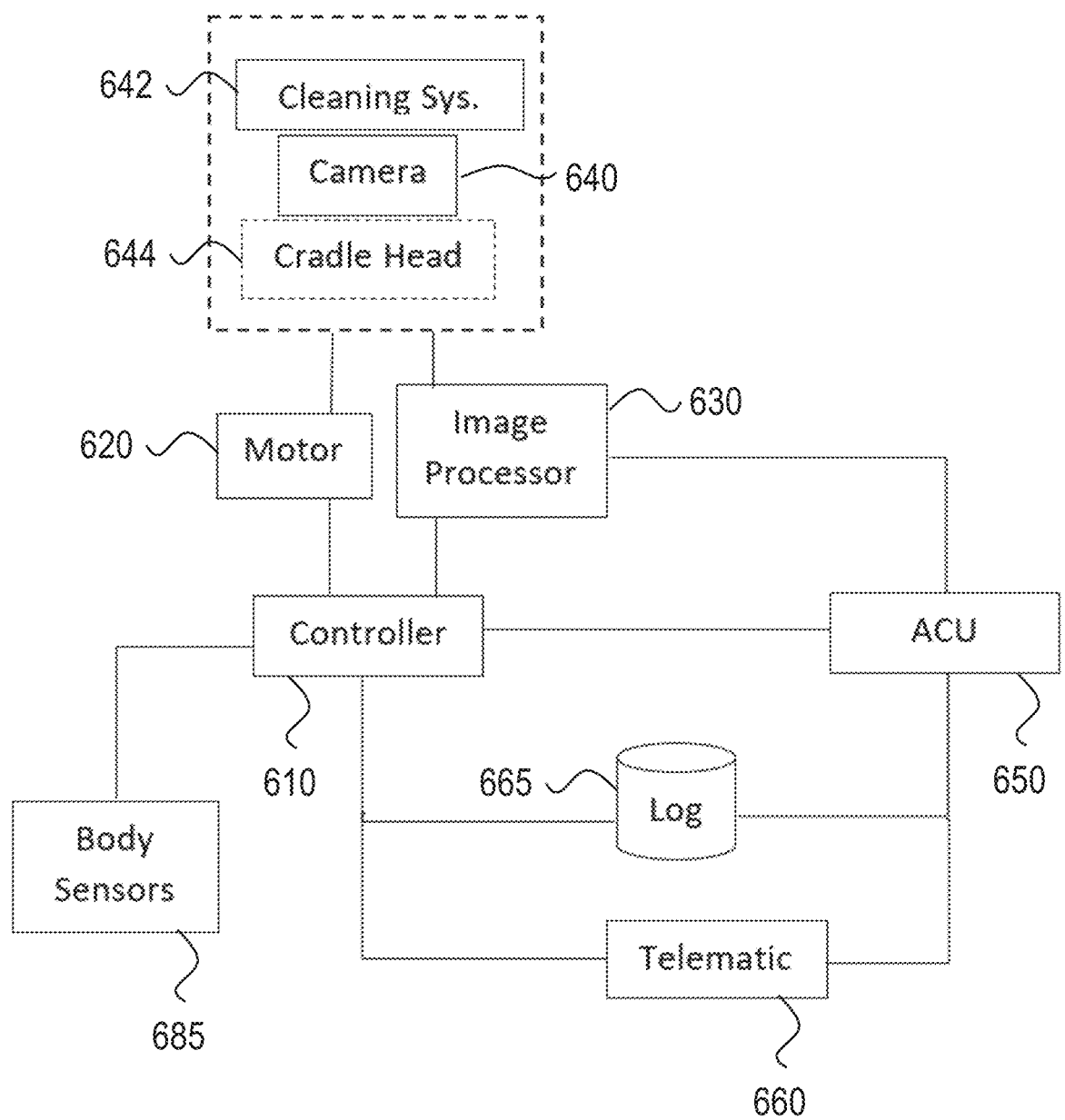
FIG. 6A shows an example of the system architecture of a rotating camera in a vehicle, in accordance with embodiments of the disclosed technology.

In some embodiments, and as shown in FIG. 6A, the rotating camera 640 may be integrated with a cleaning system 642, which includes a sprayer and wiper that ensure that the rotating camera remains clean. In some configurations, the cleaning system 642 can rotate with the camera. In other embodiments, the rotating camera 640 is located in a cradle head (or cradle) 644 to improve stabilization and mitigate vibrations from the vehicle. The cradle head 644 and the rotating camera 640 are coupled to the motor 620, which is controlled by the controller 610. In an example, the controller may receive commands from the ACU 650. In another example, the controller may receive commands from a remote monitoring station (not shown in FIG. 6) via the telematics module 660.

Figure 6C:
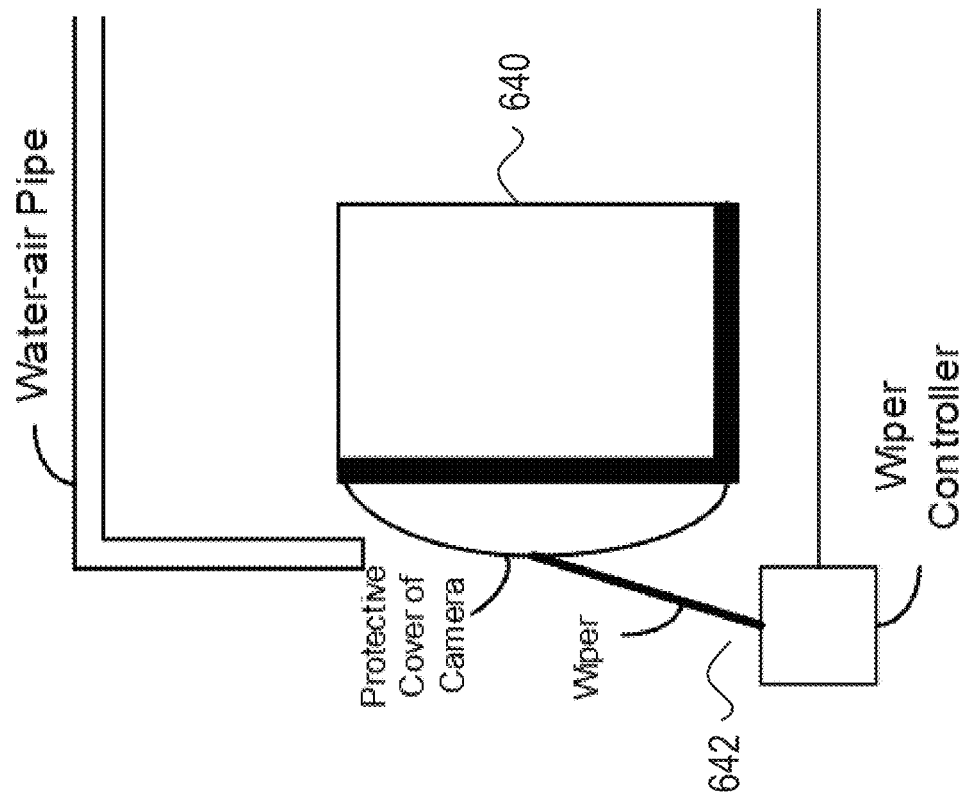
FIG. 6C shows an example of a rotating camera with a cleaning system, in accordance with embodiments of the disclosed technology.
Figure 6B:
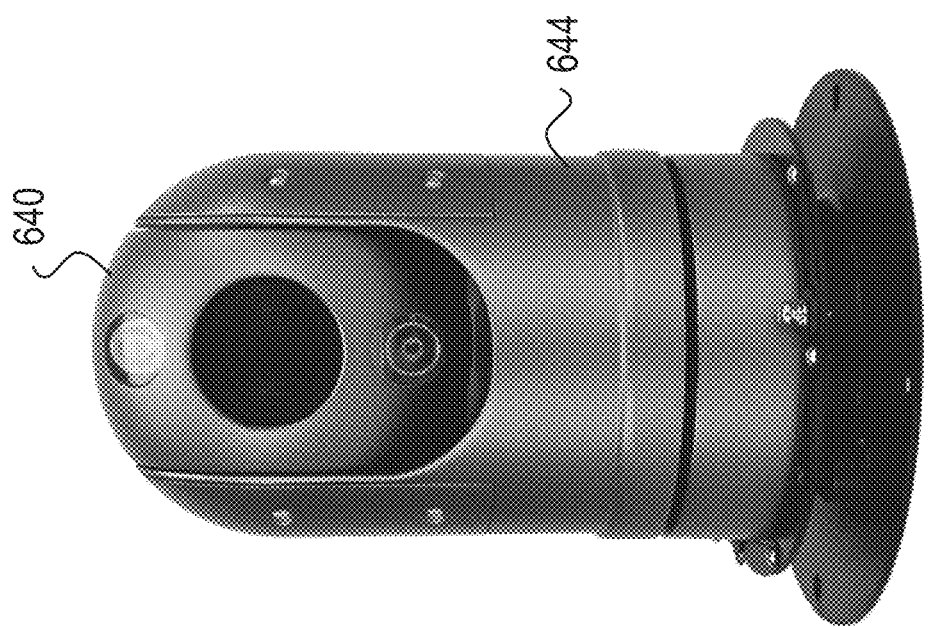
FIG. 6B shows an example of a rotating camera and its cradle, in accordance with embodiments of the disclosed technology.

FIGS. 6B and 6C show examples of the rotating camera 640 in its cradle 644 and with the cleaning system 642, respectively. As shown in FIG. 6B, the rotating camera 640 is configured to remain in its cradle 644, which may include a 3-axis gimbal that stabilizes the pan, tilt and roll of the rotating camera due to vibrations from the vehicle. In an example, the gimbal includes an Inertial Measurement Unit (IMU) to detect any sudden jolts, movement or vibrations. When the IMU detects a movement, three brushless motors in the cradle 644 are powered-up and operate to counteract the detected movement, thereby stabilizing the rotating camera 640 within milliseconds of detecting the unwanted motion.

FIG. 6C shows an example of the cleaning system 642 that includes a water-air pipe and a wiper that is attached to a wiper controller. As shown therein, the water-air pipe is configured to spray water (or more generally, a glass cleaning solution) into the protective cover of the rotating camera, which is then wiped away by the wiper and any remaining droplets removed using bursts of air from the water-air pipe.

In some embodiments, and when the vehicle has been parked, the rotating camera 640, the telematics module 660, the logging module 665 (e.g., the log 265 in FIG. 2B, which may include one or more databases that are updated periodically) and the body sensors 685 are kept powered on, whereas other systems may be powered down in order to conserve the battery of the vehicle. This configuration is referred to as low-power state of the vehicle. The transition from normal or parked operation (referred to as a high-power state of the vehicle) to the low-power state advantageously maximizes the battery life, but ensures that the safety and security of the vehicle are maintained at all times.

In an example, the transition from the high-power state to the low-power state may be triggered manually by the driver or by a supervisor at a remote monitoring station. In another example, this transition may be automatically triggered after the rotating camera is used to ascertain that the parked vehicle does not pose a hazard to itself or its surroundings. That is, the external environment may be continually monitored for a predetermined amount of time (e.g., 5 to 20 minutes), and after it has been determined that the vehicle is parked safely with respect to other vehicles and/or pedestrians, the transition to the low-power state can be automatically triggered.

Figure 7A:
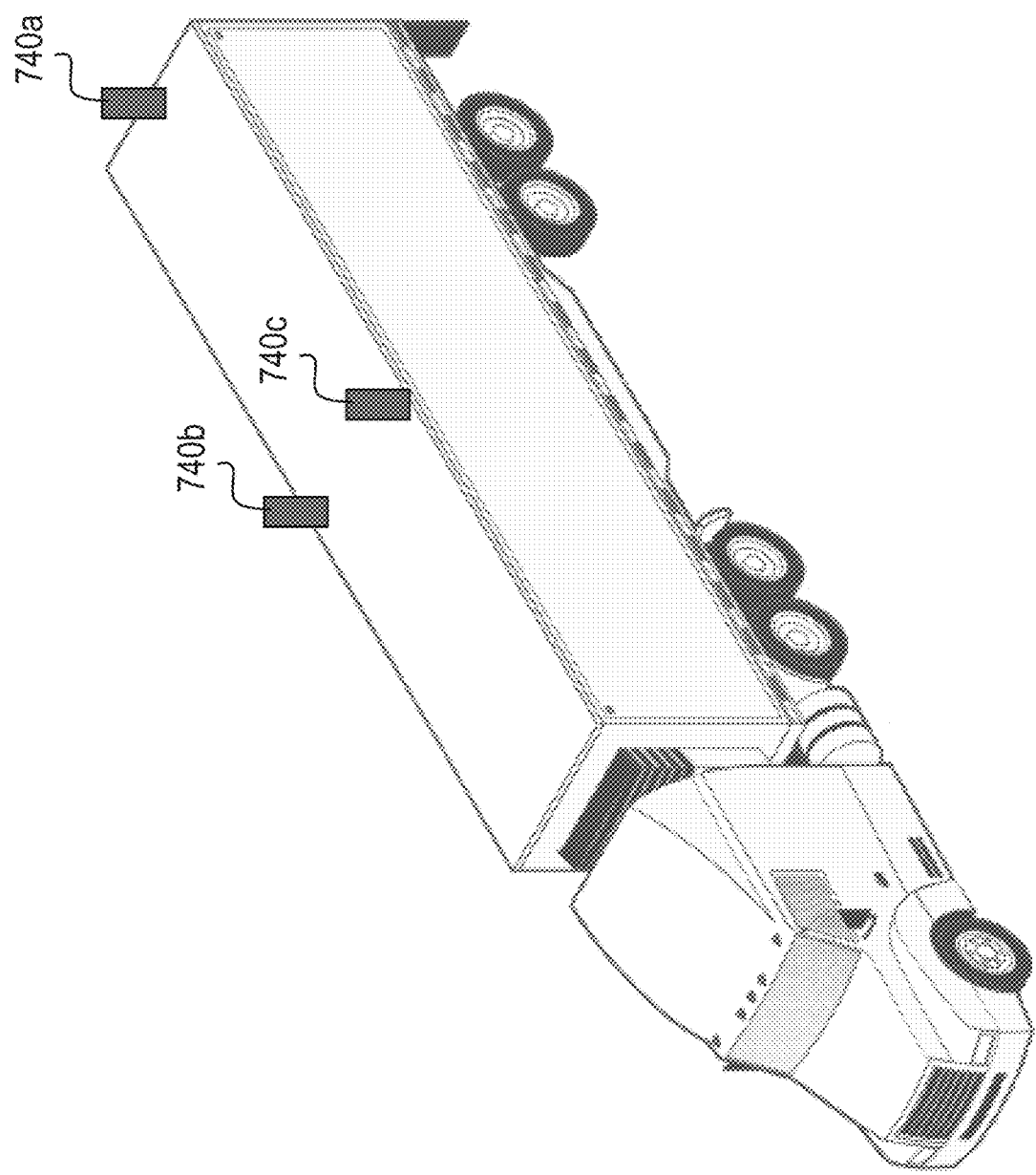
FIGS. 7A and 7B show examples of positioning one or more rotating cameras on a tractor-trailer, in accordance with embodiments of the disclosed technology.
Figure 7B:
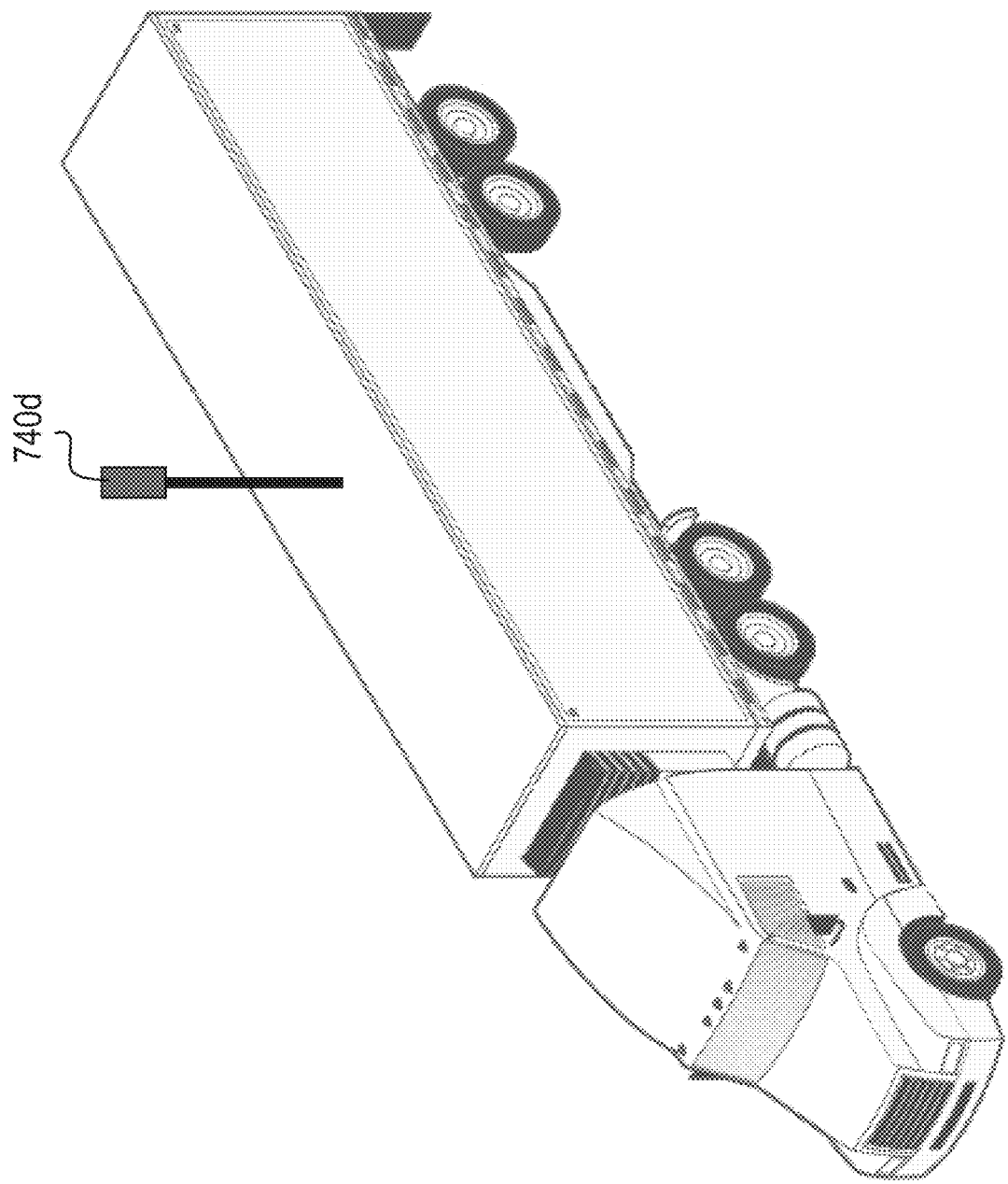

FIGS. 7A and 7B show examples of positioning one or more rotating cameras on a tractor-trailer, which advantageously enable the various capabilities described in the present document. In some embodiments, and as shown in FIG. 7A, a rotating camera 740a is mounted adjacent to the rear edge of the trailer, and additional rotating cameras (740b and 740c) are mounted adjacent to the side edges of the trailers. In an example, only a single rotating camera (e.g., 740a) may be mounted on the trailer. In other embodiments, and as shown in FIG. 7B, a single rotating camera on an extension pole (740d) may be mounted to the trailer to be able to cover the entire area around the trailer. In an example, the extension pole may be a telescoping mount whose height is controllable (e.g., by controller 210 or 310 in FIGS. 2 and 3, respectively).

Exemplary Embodiments of the Disclosed Technology

Figure 8:
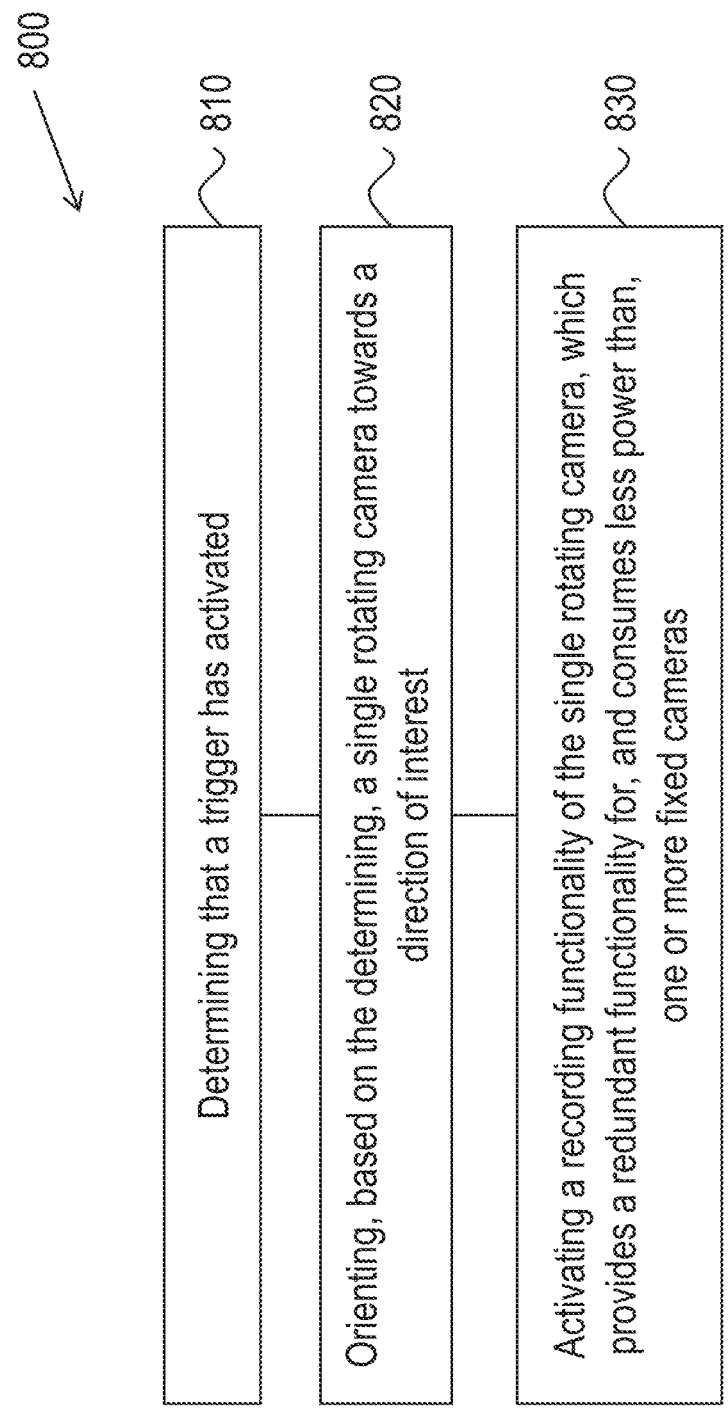
FIG. 8 shows a flowchart of an example method for using a rotating camera in a vehicle, in accordance with embodiments of the disclosed technology.

FIG. 8 shows a flowchart for an example method 800 for using a rotating camera for vehicular operation. The method 800 includes, at operation 810, determining that a trigger has activated. In some embodiments, the vehicle is an autonomous vehicle operating in a level 4 or a level 5 automation mode.

The method 800 includes, at operation 820, orienting, based on the determining, a single rotating camera towards a direction of interest.

In some embodiments, the trigger (in operation 810) and the direction of interest (in operation 820) are based on an input received at a human input interface in the vehicle. In an example, the user of the vehicle can use an interface inside the vehicle to trigger the rotating camera based on external conditions in the proximity of the vehicle. For example, in a construction or emergency zone, the rotating camera may be manually triggered and pointed, in the direction of interest, to ensure that the vehicle is safely traversing the area. In another example, the rotating camera may be manually triggered, but could be pointed based on input from an acoustic sensor; e.g., the rotating camera could be directed toward the highest decibel level in the proximate environment.

In some embodiments, and in the context of FIGS. 2B and 2C, the trigger (in operation 810) is based on a sensor determining that the vehicle made contact with an external object, and the direction of interest (in operation 820) is based on a location of the sensor on the vehicle. For example, the sensor may be an IMU attached to the tractor and/or trailer, and the direction of interest aligns with the point of impact or intrusion. For another example, the sensor is an impact sensor rated between 0.5 G and 50 G, wherein 1 G represents one gravitational force equivalent. In an example, the trigger activation also results in information related to the external object, and the video and/or images from the rotating camera being sent to the remote monitoring station via the telematics module. In some embodiments, the external object is another vehicle, and wherein the information related to the external object comprises a make, a model, a color or a license plate of the external object.

In some embodiments, and in the context of FIGS. 3A and 3B, the trigger (in operation 810) is based on an output of the ACU that controls maneuvering of the vehicle. In an example, maneuvering the vehicle is based on combining one or more maps and perception information, and identifying that the vehicle is approaching an intersection that is irregular or difficult to maneuver. In this instance, the rotating camera may be used to carefully traverse the intersection using the trigger and a direction of interest (in operation 820) that are based on the maps and perception modules. In another example, the rotating camera may be triggered when the vehicle enters a heavily populated street or area to ensure the safety of pedestrians in the vicinity of the vehicle, and where the direction of interest coincides with the location of the pedestrians.

In some embodiments, the trigger (in operation 810) and the direction of interest (in operation 820) are based on an input received over a cellular network. For example, the remote monitoring station may use the cellular network to trigger and direct the rotating camera in the different circumstances described above. The cellular network may also be used to transmit the video and/or images from the rotating camera to the remote monitoring station. In other embodiments, the remote monitoring station may use other wireless communication protocols to trigger the camera, transmit and receive commands from the vehicle, and receive image and logging information from the vehicle. The wireless communication protocols may further include Wi-Fi or Bluetooth to connect to a nearby local area network.

In some embodiments, and in the context of FIG. 5, the trigger (in operation 810) and the direction of interest (in operation 820) are based on an indication of a sensor failure. In an example, the coverage area of the sensor that has failed, which may be identified by an on-board health monitor, is compensated for using the rotating camera. As discussed in the examples above, the rotatability and scan rate of the rotating camera enables the rotating camera to provide coverage for an inoperable fixed camera and a LiDAR sensor, amongst other sensors and sensing systems.

In some embodiments, the trigger (in operation 810) is based on an external environment, and the direction of interest (in operation 820) is configured to change to provide a complete view of the external environment. In this example, the method 800 further includes the operation of initiating a parking operation upon a determination that one or more capabilities of the vehicle are not compatible with the external environment.

The method 800 includes, at operation 830, activating a recording functionality of the single rotating camera. In some embodiments, the single rotating camera provides a redundant functionality for the one or more fixed cameras, and consumes less power than the one or more fixed cameras.

In some embodiments, the method 800 further includes the operations of identifying a sensor corresponding to the indication of the sensor failure or malfunction, retrieving data from the sensor upon a determination that a quality of the data exceeds a predetermined threshold, generating, based on the recording functionality of the single rotating camera, one or more images from the single rotating camera, and integrating the one or more images with the data from the sensor to improve the driving of the vehicle.

In some embodiments, the sensor is the at least one of the one or more fixed cameras, the data from the sensor comprises at least one fixed camera image, and integrating the one or more images with the at least one fixed camera image comprises a photo-stitching operation upon a determination that the one or more images and the at least one fixed camera images have an overlapping field-of-view.

In some embodiments, the sensor is a light detection and ranging (LiDAR) sensor, and wherein the data from the sensor comprises three-dimensional point-cloud data.

Some embodiments of disclosed technology include an apparatus for improving driving of a vehicle, which may include one or more fixed cameras, a single rotating camera, a processor, and a memory comprises instructions stored thereupon, wherein the instructions when executed by the processor configure the processor to determine that a trigger has activated, orient the single rotating camera towards a direction of interest, and activate a recording functionality of the single rotating camera, wherein the single rotating camera provides redundant functionality for the one or more fixed cameras, and consumes less power than the one or more fixed cameras.

In some embodiments of the apparatus, the single rotating camera is coupled to a 3-axis gimbal that comprises a plurality of inertial measurement units (IMUs) configured to stabilize the single rotating camera by counteracting sudden movements or vibrations due to the vehicle.

In some embodiments of the apparatus, the single rotating camera is coupled to a cleaning system that is configured to rotate in conjunction with the single rotating camera.

Figure 9:
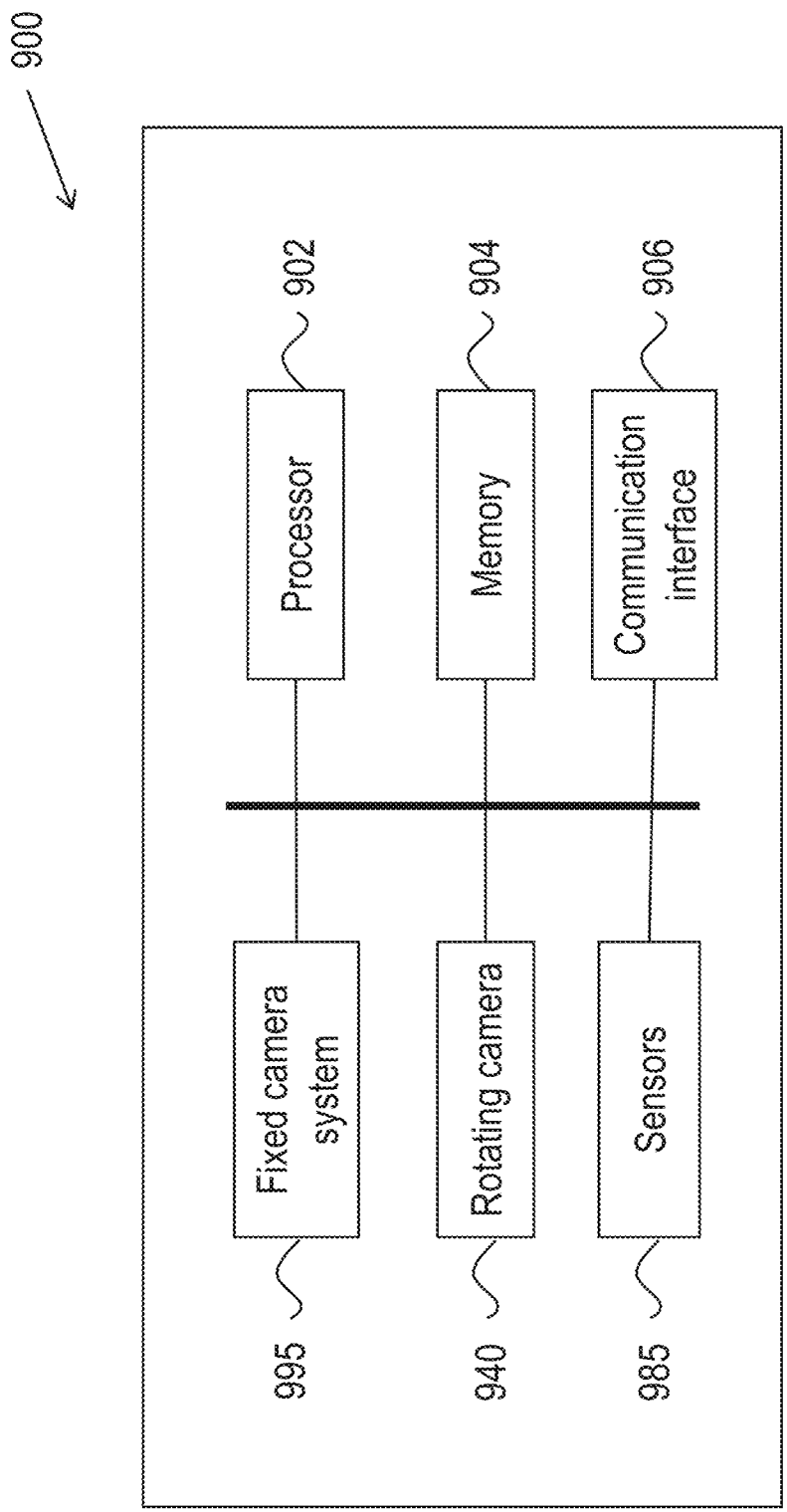
FIG. 9 shows an example of a hardware platform that can implement some techniques described in the present document.

FIG. 9 shows an example of a hardware platform 900 that can be used to implement some of the techniques described in the present document. For example, the hardware platform 900 may implement the method 800 or may implement the various modules described herein. The hardware platform 900 may include a processor 902 that can execute code to implement a method. The hardware platform 900 may include a memory 904 that may be used to store processor-executable code and/or store data. The hardware platform 900 may further include a communication interface 906. For example, the communication interface 906 may implement one or more of the communication protocols (LTE, Wi-Fi, and so on) described herein. The hardware platform may further include the rotating camera 940 in addition to the fixed camera system 995, and sensors 985 that can, in an example, trigger the rotating camera to point toward a direct of interest and activate the recording functionality.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for improving driving of a vehicle, comprising:
   determining, by a processor in the vehicle, that a trigger has activated;
   in response to the determination of the trigger having activated, orienting a single rotating camera towards a direction of interest that is related to the trigger; and
   activating a recording functionality of the single rotating camera,
   wherein the vehicle comprises the single rotating camera and one or more fixed cameras, wherein the single rotating camera provides a redundant functionality for the one or more fixed cameras, and wherein the single rotating camera consumes less power than the one or more fixed cameras.

2. The method of claim 1, wherein the trigger and the direction of interest are based on an input received at a human input interface in the vehicle.

3. The method of claim 1, wherein the trigger is based on a sensor determining that an impact between the vehicle made and an external object has occurred, and wherein the direction of interest is based on a location of the sensor on the vehicle.

4. The method of claim 3, further comprising:
   transmitting, from the vehicle to a remote monitoring site, information related to the impact and the external object.

5. The method of claim 4, wherein the external object is another vehicle, and wherein the information related to the external object comprises a make, a model, a color or a license plate of the external object.

6. The method of claim 3, wherein the sensor is an impact sensor rated between 0.5 G and 50 G, wherein 1 G represents one gravitational force equivalent.

7. A system for improving driving of a vehicle, comprising:
   one or more fixed cameras;
   a single rotating camera;
   a processor; and
   a memory comprises instructions stored thereupon, wherein the instructions when executed by the processor configure the processor to:
      determine that a trigger has activated;
      in response to the determination of the trigger having activated, orient a single rotating camera towards a direction of interest that is related to the trigger; and
      activate a recording functionality of the single rotating camera,
   wherein the single rotating camera provides redundant functionality for the one or more fixed cameras, and consumes less power than the one or more fixed cameras, and wherein the vehicle is an autonomous vehicle operating in a level 4 (L4) or a level 5 (L5) automation mode.

8. The system of claim 7, wherein the trigger is based on an output of an automation control unit (ACU) that controls maneuvering of the vehicle.

9. The system of claim 8, wherein the maneuvering of the vehicle is based on one or more maps or information from a perception module.

10. The system of claim 7, wherein the trigger and the direction of interest are based on an input received over a cellular network from a remote monitoring station.

11. The system of claim 7, wherein the trigger and the direction of interest are based on an indication of a sensor failure or malfunction.

12. The system of claim 11, wherein the instructions when executed by the processor further configure the processor to:
    identify a sensor corresponding to the indication of the sensor failure or malfunction;
    retrieve data from the sensor upon a determination that a quality of the data exceeds a predetermined threshold;
    generate, based on the recording functionality of the single rotating camera, one or more images from the single rotating camera; and
    integrate the one or more images with the data from the sensor to improve the driving of the vehicle.

13. The system of claim 12, wherein the sensor is the at least one of the one or more fixed cameras, wherein the data from the sensor comprises at least one fixed camera image, and wherein integrating the one or more images with the at least one fixed camera image comprises a photo-stitching operation upon a determination that the one or more images and the at least one fixed camera images have an overlapping field-of-view.

14. The system of claim 12, wherein the sensor is a light detection and ranging (LiDAR) sensor, and wherein the data from the sensor comprises three-dimensional point-cloud data.

15. A device for improving driving of a vehicle, comprising:
    a processor; and
    a memory including instructions stored thereupon, the instructions upon execution by the processor causing the processor to:
       determine, by a processor in the vehicle, that a trigger has activated;
       in response to the determination of the trigger having activated, orient a single rotating camera towards a direction of interest that is related to the trigger;

activate a recording functionality of the single rotating camera; and transmit information related to the trigger and the direction of interest to a remote monitoring station, wherein the vehicle comprises the single rotating camera and one or more fixed cameras, wherein the single rotating camera provides a redundant functionality for the one or more fixed cameras, and wherein the single rotating camera consumes less power than the one or more fixed cameras.

16. The device of claim 15, wherein the trigger is based on an external environment, and wherein the direction of interest is configured to change to provide a complete view of the external environment.

17. The device of claim 16, wherein the instructions upon execution by the processor further cause the processor to:

initiate a parking operation upon a determination that one or more capabilities of the vehicle are not compatible with the external environment.

18. The device of claim 15, wherein the single rotating camera is coupled to a 3-axis gimbal.

19. The device of claim 18, wherein the 3-axis gimbal comprises a plurality of inertial measurement units (IMUs) configured to stabilize the single rotating camera by counteracting sudden movements or vibrations due to the vehicle.

20. The device of claim 15, wherein the single rotating camera is coupled to a cleaning system that is configured to rotate in conjunction with the single rotating camera.

* * * * *